July 28, 1931. W. M. DARNALL 1,816,178
TESTING APPARATUS
Filed Feb. 8, 1929 2 Sheets-Sheet 2
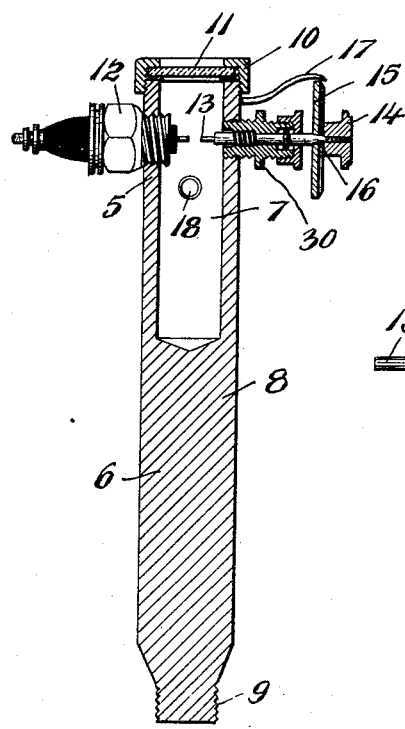
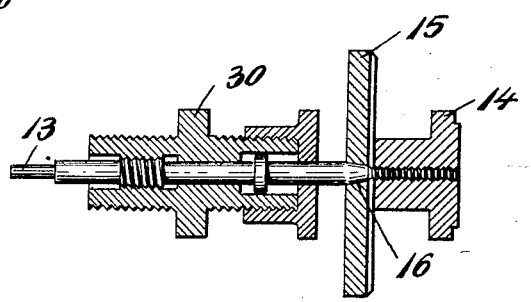
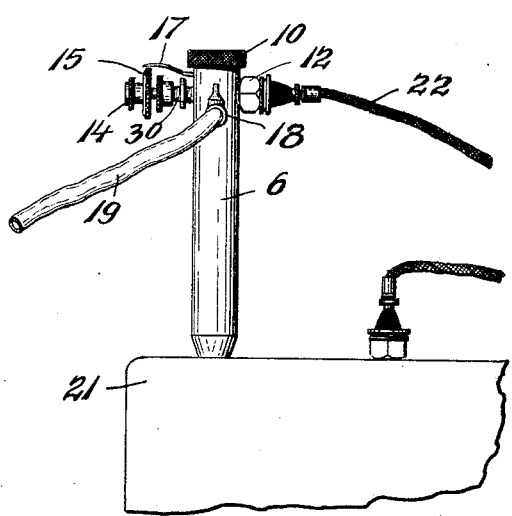
Inventor
William M. Darnall
By John A. Bommhardt
Attorney Patented July 28, 1931

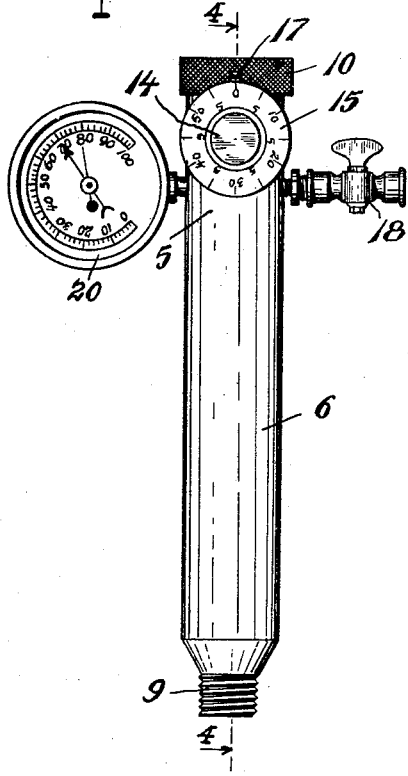
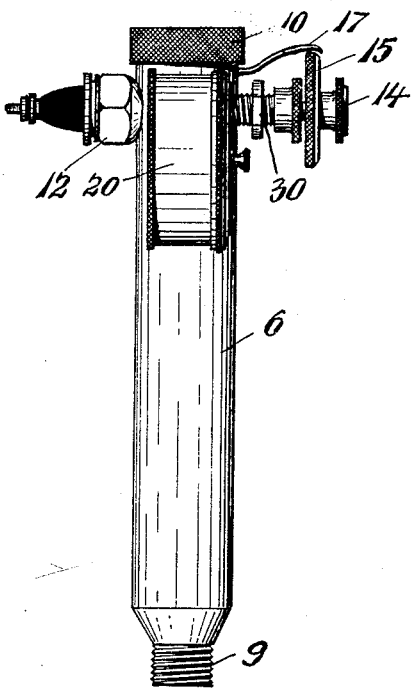
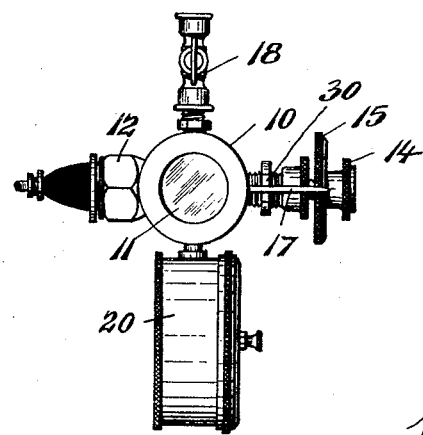

1,816,178

UNITED STATES PATENT OFFICE

WILLIAM M. DARNALL, OF LAKEWOOD, OHIO

TESTING APPARATUS

Application filed February 8, 1929. Serial No. 338,498.

This invention relates to a testing apparatus for testing or determining the cause of trouble in an ignition system of an internal combustion engine and also for testing the spark plugs thereof.

An object is to provide a device whereby it will be possible to quickly determine the seat of the trouble in a motor car where it is found difficult to start the engine, or when the engine shows a lack of power, or poor engine performance in general.

Another object is to provide a device for determining whether a spark plug of an internal combustion engine is functioning properly.

Another feature of the invention resides in a testing device enabling the load, on the coil of an ignition system, to be varied.

Other objects and advantages will be seen when taken in connection with the following description and accompanying drawings in which:

Fig. 1 is a front elevation of the tester; Fig. 2 is a side elevation; Fig. 3 is a top plan view; Fig. 4 is a longitudinal sectional view of the tester; Fig. 5 is an enlarged sectional view of the movable terminal point and Fig. 6 is a view of the device in working position on the head of an internal combustion engine.

In the drawings, in which like numerals indicate similar parts, numeral 6 designates the body of the tester. The tester is in the form of a solid rod provided at its upper portion with an air chamber 7 the lower end 8 being solid and tapering into a threaded portion 9. Around the upper portion of the body 5 are four screw threaded openings communicating with the air chamber 7. These openings are placed at equal distances about the circumference of the tester. The top of the tester is sealed by a screw cap 10 said cap containing a sight glass 11 through which the interior of the chamber 7 may be seen.

In one of the screw threaded openings is screwed a spark plug 12 of standard form, from which the outer spark wire has been removed. This plug 12 will hereinafter be referred to as the stationary terminal point.

Placed diametrically opposite this stationary terminal is a movable terminal point 13 or screw pin, which extends through a screw plug 30 in the side of the chamber and is adapted to be moved inwardly and outwardly by a knob 14. Another function of the knob 14 is to secure a dial 15 on the outer tapered end 16 of the movable pin 13. By loosening the knob the dial can be set, so that if the space between the terminals is changed the dial can be reset so that the pointer 17 indicates zero on the dial. The pointer 17 rigidly secured to the tester body extends outwardly above the periphery of the dial body thereby enabling the user to determine how many degrees the movable terminal point 13 has been moved.

Screwed into another one of the holes which is placed about the circumference of the tester is a regulating valve 18 connected by a tube 19 to any conventional form of air pressure means, not shown. This regulating valve 18 admits compressed air, or other non-explosive or non-combustible gas into the air chamber 7 the pressure in said chamber being determined by a pressure gauge 20 which is secured into the tester body.

In the operation of the device for checking the ignition system it is applicable for use both on the engine of the car, or it can be used on an electric test bench. When used on the engine it is fastened to the motor block 21 in any convenient manner. As shown in the drawings herewith it is fastened to the motor block by removing one of the spark plugs and screwing the apparatus in the spark plug hole. The only function that this has is a means for mounting the apparatus on the engine block. The spark plug wire 22 is fastened to the stationary terminal point 12, the desired air pressure is maintained by means of the regulating valve 18 and pressure gauge 20. The motor is caused to operate under its own power at the various speeds and the test is made at high, medium and low speeds. The breakdown point of the coil is determined by backing off on the adjustable point 13 and noting at which point the sparking effect starts to miss or ceases sparking, which can be noted by looking through the sight glass 11.

To determine the pressure of a cylinder, remove the pressure gauge and screw it into the spark plug hole in the cylinder head, crank the motor and observe the cylinder compression pressure as indicated on the dial of the gauge.

In testing a spark plug remove the stationary plug 12 and set back pin 13 by unscrewing the dial knob 14. The spark plug to be tested is screwed into the hole from which the stationary plug has been removed, the spark plug is then connected up to the tester and the desired pressure is obtained by regulating valve 18 and observing gauge 20. The spark plug is caused to function by starting the motor and observing the sparking effect under the different desired pressures.

I claim:

A tester comprising a rod screw threaded at one end and containing an air chamber at the opposite end, a stationary terminal in the chamber, an adjustable terminal pin projecting into the chamber opposite the stationary terminal to form a spark gap, a dial and knob on the outer end of said adjustable terminal pin, a sight glass closing the chamber, and means to admit air under pressure into the chamber.

In testimony whereof, I affix my signature.

WILLIAM M. DARNALL.